United States Patent [19]

Crosnier et al.

[11] Patent Number: 5,267,673
[45] Date of Patent: Dec. 7, 1993

[54] DOSING DEVICE WHICH CAN BE PLACED ON VARIOUS CONTAINERS

[76] Inventors: Daniel Crosnier, 14 rue Jacques Lanty, 76550 Offranville; Jean-Marie Dulery, 53 avenue Pierre Semard, 94210 La Varenne, both of France

[21] Appl. No.: 816,767
[22] Filed: Jan. 2, 1992
[30] Foreign Application Priority Data
Mar. 11, 1991 [FR] France ............... 91 03079
[51] Int. Cl.⁵ ........................................... G01F 11/00
[52] U.S. Cl. .................... 222/321; 222/387; 222/494
[58] Field of Search .............. 222/321, 380, 383, 387, 222/494, 320, 206, 207, 209, 212, 213, 214

[56] References Cited

U.S. PATENT DOCUMENTS

| | | | |
|---|---|---|---|
| 3,507,586 | 4/1970 | Gronemeyer et al. | 222/321 X |
| 3,753,518 | 8/1973 | Kutik | 222/383 |
| 4,795,063 | 1/1989 | Sekiguchi et al. | 222/321 X |
| 4,807,784 | 2/1989 | Jupin et al. | 222/207 |
| 4,875,604 | 10/1989 | Czech | 222/321 X |
| 4,941,598 | 7/1990 | Lambelet, Jr. et al. | 222/321 |
| 5,014,881 | 5/1991 | Andris | 222/321 X |
| 5,100,027 | 3/1992 | Guéret | 222/321 X |

FOREIGN PATENT DOCUMENTS

| | | | |
|---|---|---|---|
| 891908 | 3/1962 | United Kingdom | 222/321 |
| 005091 | 5/1990 | World Int. Prop. O. | 222/321 |

*Primary Examiner*—Andres Kashnikow
*Assistant Examiner*—Anthoula Pomrening
*Attorney, Agent, or Firm*—Ostrolenk, Faber, Gerb & Soffen

[57] ABSTRACT

A dosing device for containers comprising a unit having an inner part (1) made of a flexible elastic material, placed in a cap (2) made of a rigid material. The unit either fits onto a container (3) having an assembling part whose shape is adapted to receive the unit, or the unit can be integral with the container. The elasticity of the part (1), and its form which is associated with the form of the cap (2), produces and discharges a dose when pressure is exerted on the cap (2), without allowing air from outside the container to come in contact with the contents (31) of the container (3).

13 Claims, 5 Drawing Sheets

DOSING DEVICE WHICH CAN BE PLACED ON VARIOUS CONTAINERS

BACKGROUND OF THE INVENTION

The object of the present invention is a dosing device which can be placed on various containers, such as rigid or flexible bottles, tubes or jars, used primarily in the field of pharmacy and cosmetics.

In certain fields, particularly those mentioned above, it may be necessary to remove liquid or paste products from their container in relatively precise doses.

Dosing devices which make it possible to obtain this result, that is to say to form and expel a dose, exist at the present time. However, these devices, while they satisfactorily form and expel of a dose, are not without drawbacks, particularly with regard to their manufacture.

In fact, in order to produce a dosing device, it is necessary to assemble several parts, on the average about ten, such as ball, springs, valves, stopper, and others. To the expense of all these parts there must be added the expense for the manual or automatic assembling, which represents an important part of the cost of manufacture.

Furthermore, these devices have drawbacks, such as insufficient tightness and the admission of outside air into the interior after the expulsion phase, which makes it necessary to incorporate preservatives in the contents in order to avoid the oxidation thereof.

Certain known dosing devices make it possible to avoid these drawbacks, but this is done by the addition of further parts, which increases the cost of manufacture.

SUMMARY OF THE INVENTION

The present invention makes it possible to overcome all these drawbacks of the known devices by proposing a dosing device which comprises a reduced number of parts which can be easily assembled, and therefore a reduced cost of manufacture. The dosing device of the invention performs the functions of an improved dosing device, namely form the dose, expel it, reproduce it, avoid the inclusion of outside air in the interior, and remain tight.

The dosing device which forms the object of the invention comprises an inner part made of an elastic deformable material which fits in an outer part or cap made of a rigid material. The assembly can be fitted on a container either via a third part or directly in the event that said container has an assembly part of suitable shape, in which connection the bottles or jars on which this dosing device can be placed may or may not be provided with a compression system such as a piston.

The inner part of the device of the invention is preferably formed by molding of a synthetic elastomer, which imparts to it qualities of deformability and elasticity which make it possible to assure the tightness of the device, permit the dose to escape, and aspirate the contents so as to form a new dose.

Other features and advantages of the present invention will become apparent from the following description of the invention which refers to the accompanying drawings.

DETAILED DESCRIPTION OF THE INVENTION

Figure 1:
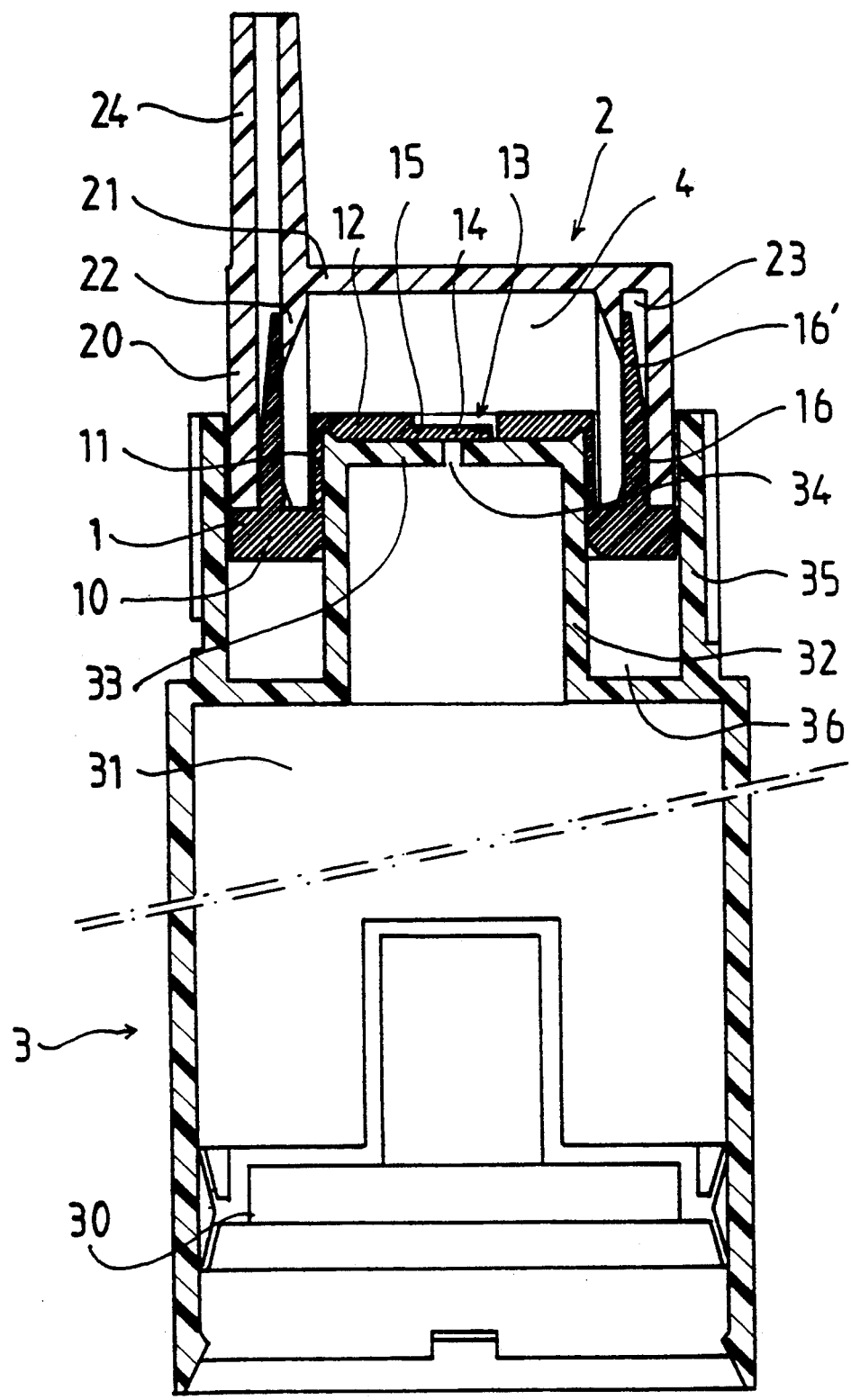
FIG. 1 is a view in vertical section through a bottle provided with the dosing device in accordance with the invention.

Referring to FIG. 1, it can be seen that the dosing device of the invention comprises an inner part 1 (made of synthetic elastomer) placed in a cap 2 (made of thermo-plastic material), the assembly being fitted on a container 3.

The container 3 is provided on the inside, at its lower part, with a piston 30 which can slide upward in said container 3 as the contents 31 are emptied.

The container 3 is extended at its upper part by a cylindrical part 32 closed at its upper part by a wall 33 pierced axially by an orifice 34 for the evacuation of the contents 31. The cylindrical part 32 is surrounded concentrically by a cylindrical cage 35 providing a cylindrical annular space 36 between them.

Figure 2B:
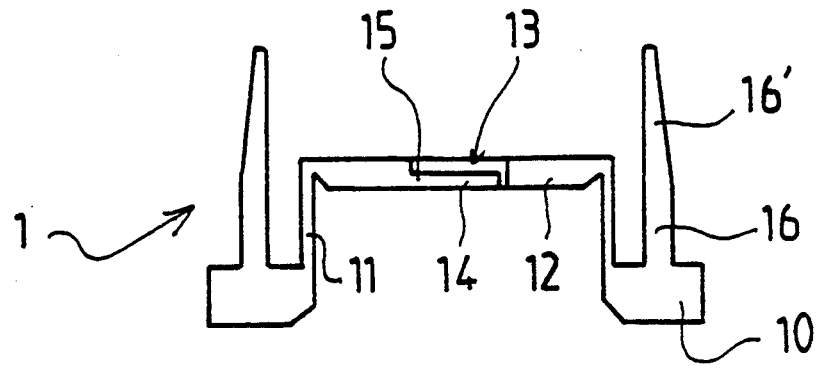
FIG. 2b is a sectional view through the same part.
Figure 2C:
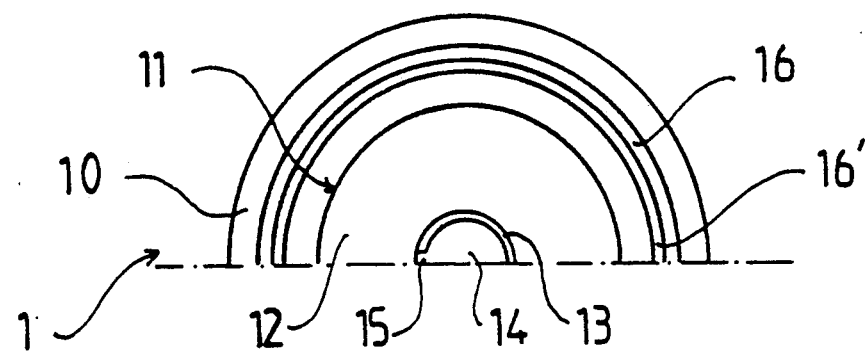
FIG. 2c is a partial plan view of the same device.
Figure 2A:
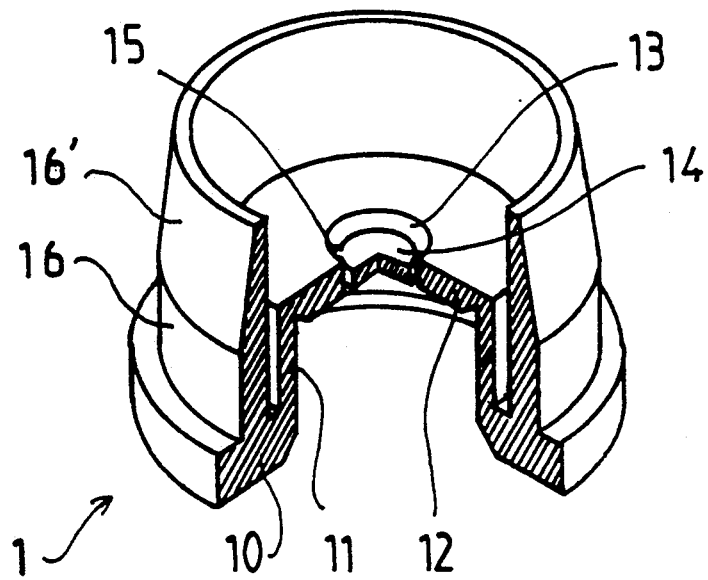
FIG. 2a is a perspective view, partially broken away, of the inner part of this device.

Referring to FIGS. 2a, 2b and 2c, it can be seen that the inner part 1, of general cylindrical shape, comprises an annular part 10, the diametral dimensions of which are those of the space 36 and the inner edge of which is extended upwards by a tubular part 11. The upper opening of the tubular part 11 is closed by a wall 12 pierced at its center by an orifice 13, which is partially closed by a flap 14 fastened to the edges of the said orifice 13 by one or more tongues 15 which permit the lifting of said flap 14. The part 1 also comprises on its outside, concentric to the tubular part 11, a tubular part 16 the lower part of which, attached to the annular part 10, is cylindrical and is extended by a frustoconical upper part 16', the inner face of which extends along the extension of the inner face of the lower part.

The cap 2 of the dosing device comprises a cylindrical body 20, closed at its upper part by a wall 21, and the outside diameter of which is slightly less than the inside diameter of the cage 35. The cap 2 has on the inside on the wall 21, an annular rim 22 having an outside diameter equal to the inside diameter of the tubular part 16 of the part 1. The annular space 23 present between the annular rim 22 and the body 20 is extended by an expulsion conduit 24.

Upon the assembling of the part 1 and the cap 2, the cap 2 tightly covers the tubular part 16 of the part 1 so that the inner face of the body 20 is in close contact with the outer face of the tubular part 16, the lower rim of the body 20 resting on the annular part 10 of the part 1 and the upper end 16' of the tubular part 16 fitting within the annular space 23 so that the inner face of the part 16' is in close contact with the outer face of the annular rim 22. The inner face of the wall 21 of the cap 2 is at a certain distance from the wall 12 of the part 1, thus providing a certain space 4.

The cap 2, assembled on to the part 1, is placed on the container 3, the annular part 10 being engaged in the space 36, the tubular part 11 being positioned on the cylindrical part 32 until the part 12 enters into contact with the wall 33, the heights of the different cylindrical parts being such that the distance between the lower face of the annular part 10 of the part 1 and the bottom of the space 36 is equal to the distance between the inner face of the wall 21 and the upper face of the wall 12 of the part 1.

Figure 3:
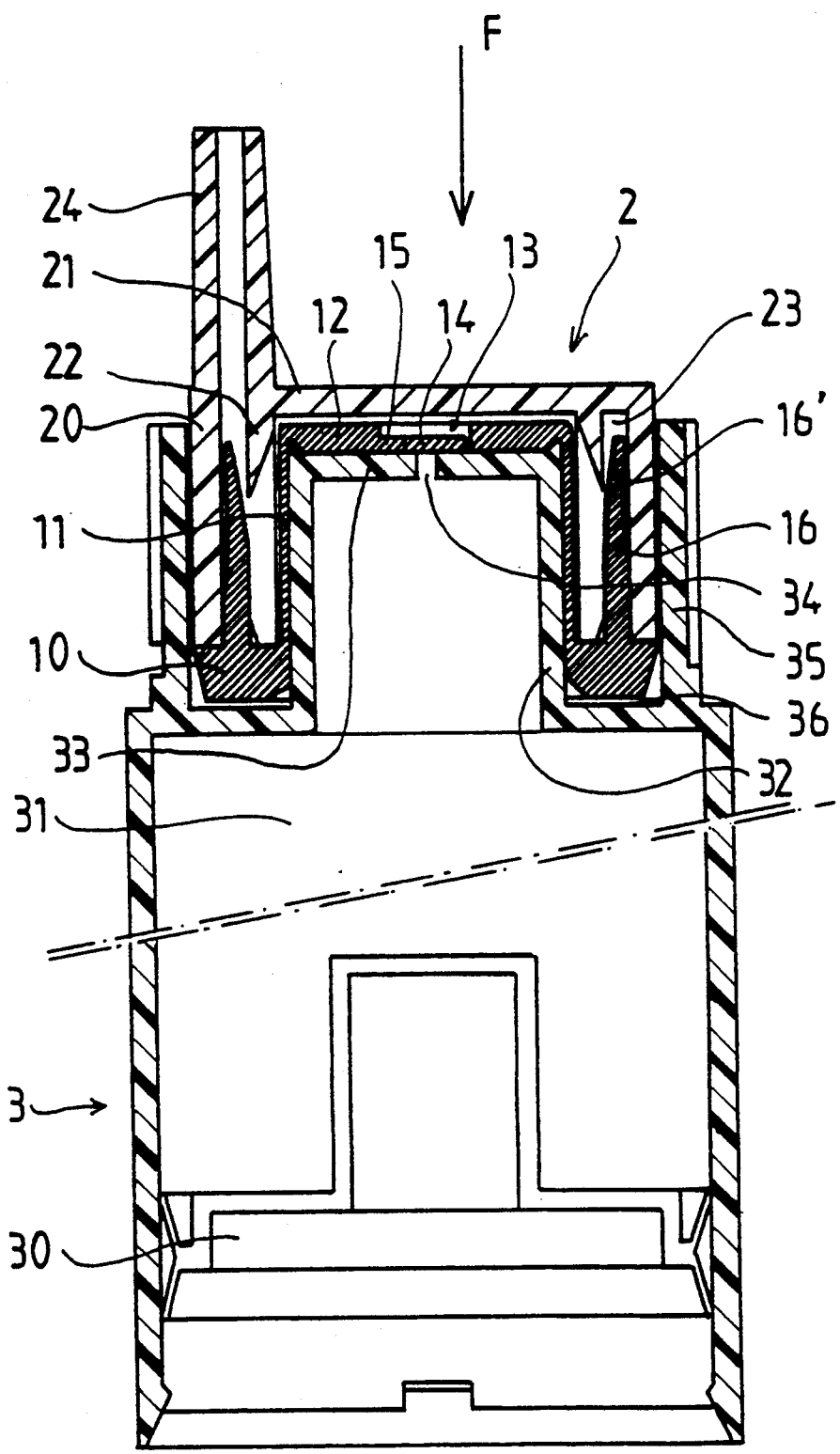
FIG. 3 is a vertical section through the bottle of FIG. 1 when pressure is applied to the cap.

Referring now to FIG. 3, it can be seen that when a vertical pressure, symbolized by the arrow F, is exerted on the cap 2, the part 1, which is elastic, is deformed lengthening in its tubular part 11. The air enclosed in the space 36 can escape due to the difference in diameter between the cage 35 and the annular part 10; the space 4 is compressed and, under the effect of this compression, the upper part 16' of the tubular part 16 is detached from the annular rim 22, which permits the contents in the space 4 to escape through the annular space 23 and then through the evacuation conduit 24. At the same time, this same compression presses the flap 14 against the orifice 34, preventing any exchange between the container 3 and the space 4.

When the pressure on the cap 2 is relaxed, the tubular part 11 of the part 1 returns to its initial shape, which creates a vacuum. The end parts 16' of the tubular part 16, of the part 1, came against the annular rim 22, the flap 14 lifts, and the contents 31 are aspirated and thereby came to occupy the space 4 while the piston 30 rises in the container 3. Therefore, no outside air is introduced into the inside; on the one hand, the aspiration takes place at the level of the contents 31 and, on the other hand, the air is stopped by the hermetic joint which constitutes the part 16' applied against the annular rim 22.

It will be understood that when such a dosing device is mounted on a flexible container of a tube type, the aspiration of the contents upon the release of the pressure results in an external deformation of the said container.

The space 4 is fixed upon manufacture and constitutes the desired volume of dose.

Figure 4:
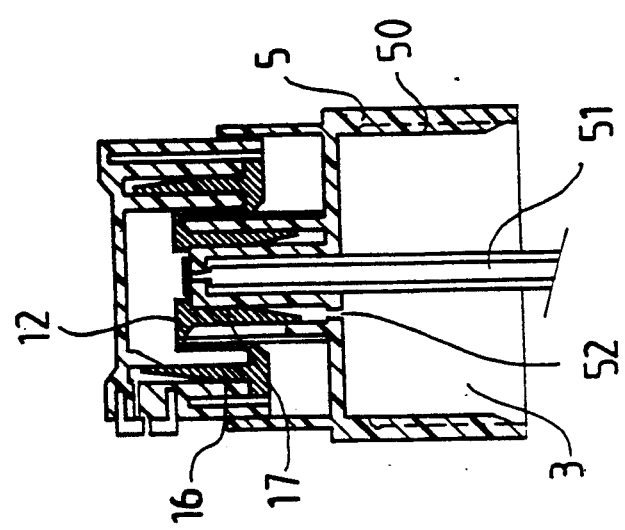
FIG. 4 is a vertical section through another embodiment of the device in accordance with the invention, fitted by means of a third part on a conventional container, in the present case a rigid bottle with dip tube.

If one refers now to FIG. 4, it can be seen that the device can be fitted on any container 3 the mouth of which is provided, for instance, with a screw thread; it is then sufficient to place on the screw thread a part 5 which has the shape of the assembly part of the container previously described and is provided with a screw thread 50.

In the special case shown of a rigid container filled with a liquid 31 and equipped with a dip tube 51, it is necessary to take in outer air, this being effected through an orifice 52 which communicates with the outside. The arrangement will in this case advantageously be supplemented by a modification of the part 1 which comprises a tubular part 17, which moves on the inside, downward, below the part 12. The tubular part 17 functions the same as the part 16' with respect to the outer air, by deforming to permit the outer air to penetrate into the container 3 through the orifice 52, but preventing any departure of the contents 31 when the receptacles is held upside down.

Figure 5:
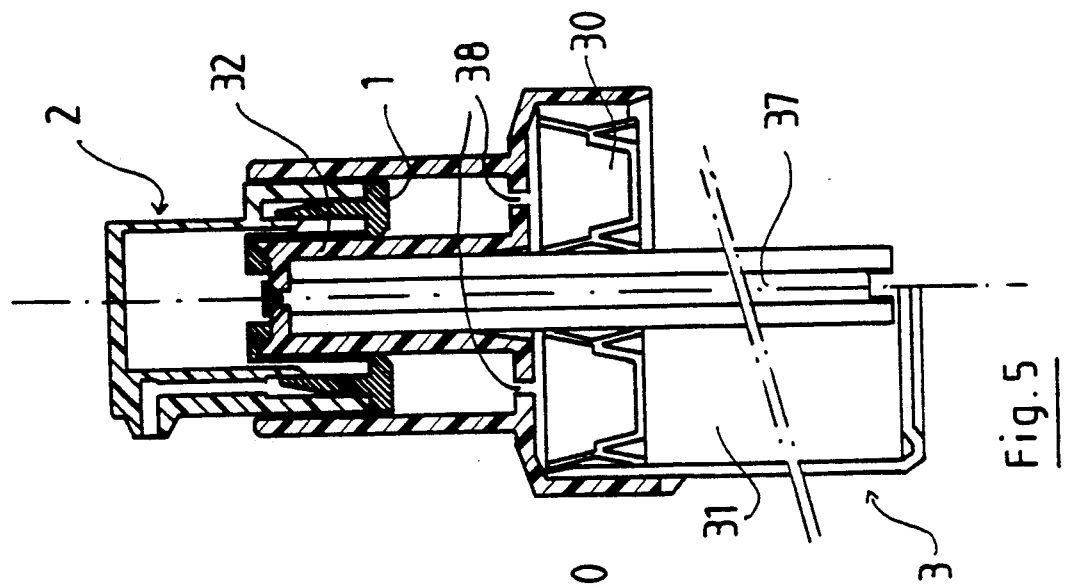
FIG. 5 is a sectional view through a bottle provided with a dosing device, the bottle being rigid and having a dip tube.

Referring now to FIG. 5, it can be seen that the dosing device of the invention can be placed on a container 3 provided with a dip tube 37, connecting on the orifice 34 so that outer air can be admitted into the container 3 without this air coming into contact with the contents 31. A piston 30 placed in the upper part of the container 3 around the dip tube 37 moves downward, pushing the contents 31 towards the mouth of the dip tube 37, the outside air entering into the container 3 behind the piston 30 through orifices 38 made in the bottom of the space 36.

Figure 6:
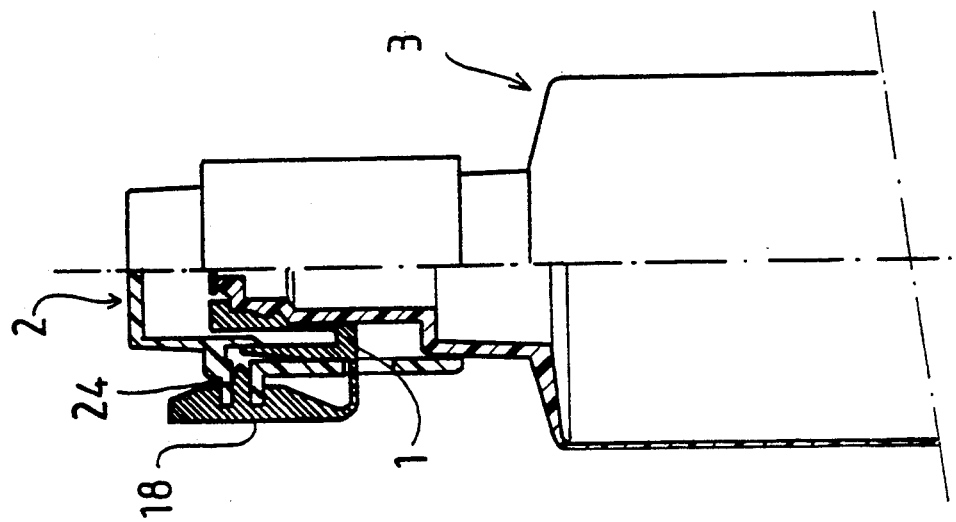
FIG. 6 is a partial vertical section through a bottle equipped with a dosing device the inner part of which comprises an outer closure system.

Referring now to FIG. 6, it can be seen that, upon the molding of the part 1, an outer stopper 18 can be produced making it possible to close off the evacuation conduit 24.

Figure 7:
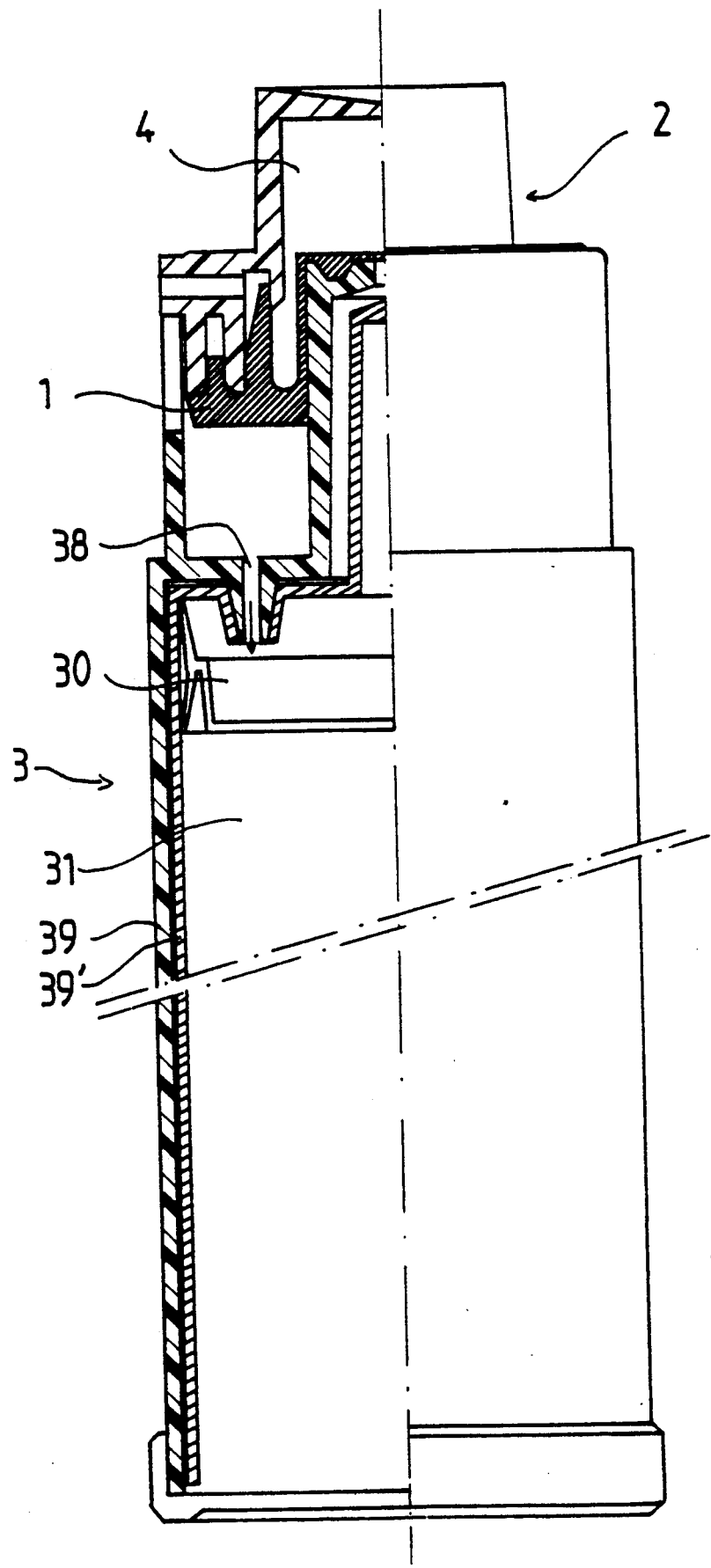
FIG. 7 is partial vertical section through a bottle provided with a dosing device, the bottle being provided with a piston for taking up air and which permits the user to see the contents.

Referring finally to FIG. 7, it is seen that it is possible to adopt, in part, the device of FIG. 5, namely a piston operating in a downward direction in the case of a container 3, which is not provided with a dip tube. The container 3 in this embodiment has a double wall, namely a transparent outer wall 39 and an opaque inner wall 39', the space between the two walls communicating at the lower part with the inside of the container 3 in which the piston 30 travels. In this case, upon the formation of a dose in the space 4, the contents 31 rise between the walls 39 and 39', being thus visible from the outside, and fill the space 4, the intake of outer air taking place behind the piston 30 and not coming into contact with the contents 31.

It is also possible to produce a dosing device which permits the mixing of several products at the time of the formation of the dose in the space 4.

It goes without saying that the present invention is not limited to the foregoing description of certain of its embodiments, which are capable of undergoing modification without thereby going beyond the scope of the invention.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A dosing device which is adapted to be associated with various containers such as bottles, tubes or jars, comprising:
 a first unit including an inner part made of an elastic, deformable material and an outer cap part made of rigid material; the inner part being placed in the outer cap part; and
 a second unit on a container having contents to be dosed, the first unit fitting on the second unit, the second unit being formed of a cylindrical part closed at its upper end by a wall which is pierced axially by an orifice for the evacuation of the contents of said concentrically by a cylindrical cage, providing between them an annular space;
 wherein the inner part of the first unit, having a generally cylindrical shape, comprises an annular part the inner edge of which is extended upward by a tubular part, the tubular part having an upper opening which is closed by a wall pierced at its center by an orifice which is partially closed by a flap fastened on the edges of the orifice; and furthermore comprises, on the outside, concentric to the tubular part, a cylindrical tubular lower part attached at its base to the annular part and extended by a frustoconical upper part, an inner face of the frustoconical upper part forming a continuous face with an inner face of the cylindrical tubular lower part; and the outer cap part of the first unit having a cylindrical body which is closed at its upper part by a wall and the outside diameter of which is slightly less than the inside diameter of the cylindrical cage of the second unit; and furthermore having on the inside, on the wall, an annular rim of the outside diameter equal to the inside diameter of the cylindrical tubular lower part of the inner part; the cylindrical body and the annular rim being separated by an annular space, the annular space provided between the annular rim and the cylindrical body being extended by an expulsion conduit.

2. A device according to claim 1, wherein the second unit includes a third unit provided with a screw thread for fitting the second unit on the container provided at its opening with a corresponding screw thread.

3. A dosing device for being associated with a container having contents to be dosed, the dosing device comprising:

a first unit comprising an inner deformable part and an outer cap part, the inner deformable part being disposed in the outer cap part so as to form a predetermined first space therein; the outer cap part having an expulsion conduit for discharging contents from the first space; the inner deformable part and the outer cap part forming a first valve arrangement, the first valve arrangement allowing discharge through the expulsion conduit but preventing flow in through the expulsion conduit into the first space in the outer cap part; and a second unit adapted for being associated with a container having contents to be dosed, the first unit fitting on the second unit, the second unit having means permitting the outer cap part of the first unit to be movable between a pressed position and a released position; the second unit having an orifice for discharge of the contents of the container into the first space in the outer cap part of the first unit; the inner deformable part of the first unit forming a second valve arrangement with the second unit, the second valve arrangement allowing discharge of the contents of the container through the orifice but preventing flow from the first space in the outer cap part into the container;

wherein the first and the second units cooperate to deform the inner deformable part by relative movement between the first and the second units when the outer cap part of the first unit is pressed, thereby compressing the first space in the outer cap part so as to force contents of the first space through the first valve arrangement and out of the expulsion conduit; and the inner deformable part is relaxed when the outer cap part is released, thereby expanding the first space in the outer cap part so as to draw the contents of the container through the second valve arrangement into the first space in the outer cap part;

the second unit comprises an inner wall having at its upper end the orifice for the discharge of the contents of the container; and an outer wall surrounding the inner wall and separated therefrom by a predetermined second space therebetween, the second space comprising the means permitting the outer cap part of the first unit to be movable between the pressed position and the released position; and a part of the outer cap part and a part of the inner deformable part move within the second predetermined space when the outer cap part is pressed.

4. A device according to claim 3, wherein the second unit includes a third unit provided with a screw thread for fitting the second unit on the container provided at is opening with a corresponding screw thread.

5. A device according to claim 3, wherein the second unit is integrally formed with a container for containing the contents to be dosed.

6. A device according to claim 3, wherein the outer cap part of the first unit is made of rigid material.

7. A device according to claim 3, wherein the inner part is made of elastic, deformable material.

8. A device according to claim 3, wherein pressing the outer cap part of the first unit closes the second valve arrangement and releasing the outer cap part closes the first valve arrangement.

9. A device according to claim 3, wherein downward movement of the outer cap part expels air from the second predetermined space, and upward movement of the outer cap part creates a vacuum to draw the contents of the container into the first predetermined space.

10. A device according to claim 3, wherein the inner and the outer walls of the second unit are cylindrical, and the outer wall cylindrically surround the unit wall so as to annularly define said second predetermined space therebetween.

11. A device according to claim 10, wherein the inner deformable part of the first unit has a generally cylindrical shape, the inner deformable part comprising an annular part having an inner edge which is expended upward by a tubular part, the tubular part having an upper opening which is closed by a wall pierced by an orifice which is partially closed by a flap, the flap and the orifice of the inner wall of the second unit comprising the second valve arrangement.

12. A device according to claim 11, wherein the inner deformable part of the first unit further comprises, on the outside, concentric to the tubular part, a cylindrical tubular lower part attached at its base to the annular part and extended by a frustoconical upper part, an inner face of the frustoconical upper part forming a continuous face with an inner face of the cylindrical lower part.

13. A device according to claim 12, wherein the outer cap part of the first unit has a cylindrical body which is closed at its upper part by a wall and the outside diameter of which is slightly less than the inside diameter of the outer wall of the second unit; and furthermore having on the inside, on the wall, an annular rim having an outside diameter equal to the inside diameter of the cylindrical tubular lower part of the inner part; the cylindrical body and the annular rim being separated by an annular space, the annular space provided between the annular rim and the cylindrical body being extended by the expulsion conduit, and the annular rim and the frustoconical upper part of the inner part comprising the first valve arrangement.

* * * * *